US012695770B2

(12) United States Patent
Gorin et al.

(10) Patent No.: US 12,695,770 B2
(45) Date of Patent: Jul. 28, 2026

(54) SYSTEM AND METHOD THEREOF FOR ENHANCED COLLECTION OF DATA OF THIRD-PARTY APPLICATIONS

(71) Applicant: Zscaler, Inc., San Jose, CA (US)

(72) Inventors: Boris Gorin, Tel Aviv (IL); Niv Steingarten, Tel Aviv (IL)

(73) Assignee: Zscaler, Inc., San Jose, CA (US)

( * ) Notice: Subject to any disclaimer, the term of this patent is extended or adjusted under 35 U.S.C. 154(b) by 333 days.

(21) Appl. No.: 18/447,938

(22) Filed: Aug. 10, 2023

(65) Prior Publication Data

US 2025/0055866 A1      Feb. 13, 2025

(51) Int. Cl.
H04L 9/40 (2022.01)
(52) U.S. Cl.
CPC ................................ H04L 63/1425 (2013.01)
(58) Field of Classification Search
CPC .... G06Q 30/0201; G06N 5/022; H04L 63/08; H04L 63/1425; H04L 67/306; H04L 67/02
See application file for complete search history.

(56) References Cited

U.S. PATENT DOCUMENTS

| | | |
|---|---|---|
| 10,581,876 B2 | 3/2020 | Elgressy et al. |
| 2015/0281258 A1* | 10/2015 | Watkins ............. G06Q 30/0277 |
| | | 726/23 |
| 2018/0337910 A1* | 11/2018 | Gustavson ............ H04L 63/168 |

* cited by examiner

*Primary Examiner* — Ryan J Jakovac
(74) *Attorney, Agent, or Firm* — Baratta Law PLLC; Lawrence A. Baratta, Jr.

(57) ABSTRACT

The disclosed system and methods are used for collecting information of third-party applications. A search is performed for detecting uniform resource locator (URL) that is associated with a web page allowing to download at least one third-party application. The search is based on URL patterns that are previously and uniquely determined for each digital data source. An identifier, e.g., client ID, of a third-party application is extracted from each URL of a web page which allows to download a third-party application. Then, the system initiates a software as a service (SaaS) instance in a cloud-based computing environment. The system provides to the third-party application access credentials to access the SaaS instance and extract attributes and behavior data of the third-party application based on at least the actions performed by the third-party application in the SaaS instance.

15 Claims, 6 Drawing Sheets

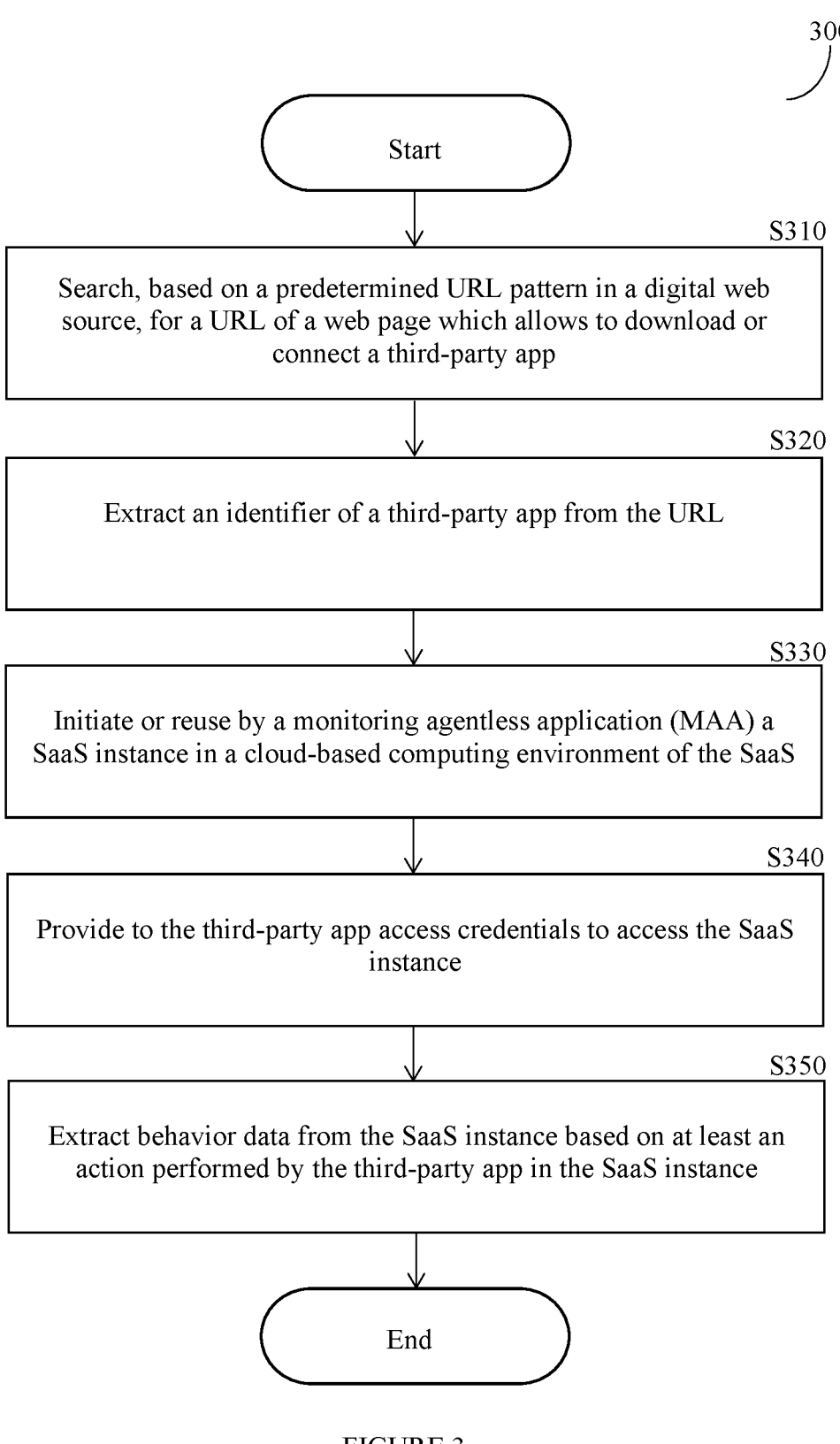

300

Start

S310

Search, based on a predetermined URL pattern in a digital web source, for a URL of a web page which allows to download or connect a third-party app

S320

Extract an identifier of a third-party app from the URL

S330

Initiate or reuse by a monitoring agentless application (MAA) a SaaS instance in a cloud-based computing environment of the SaaS

S340

Provide to the third-party app access credentials to access the SaaS instance

S350

Extract behavior data from the SaaS instance based on at least an action performed by the third-party app in the SaaS instance End

FIGURE 3

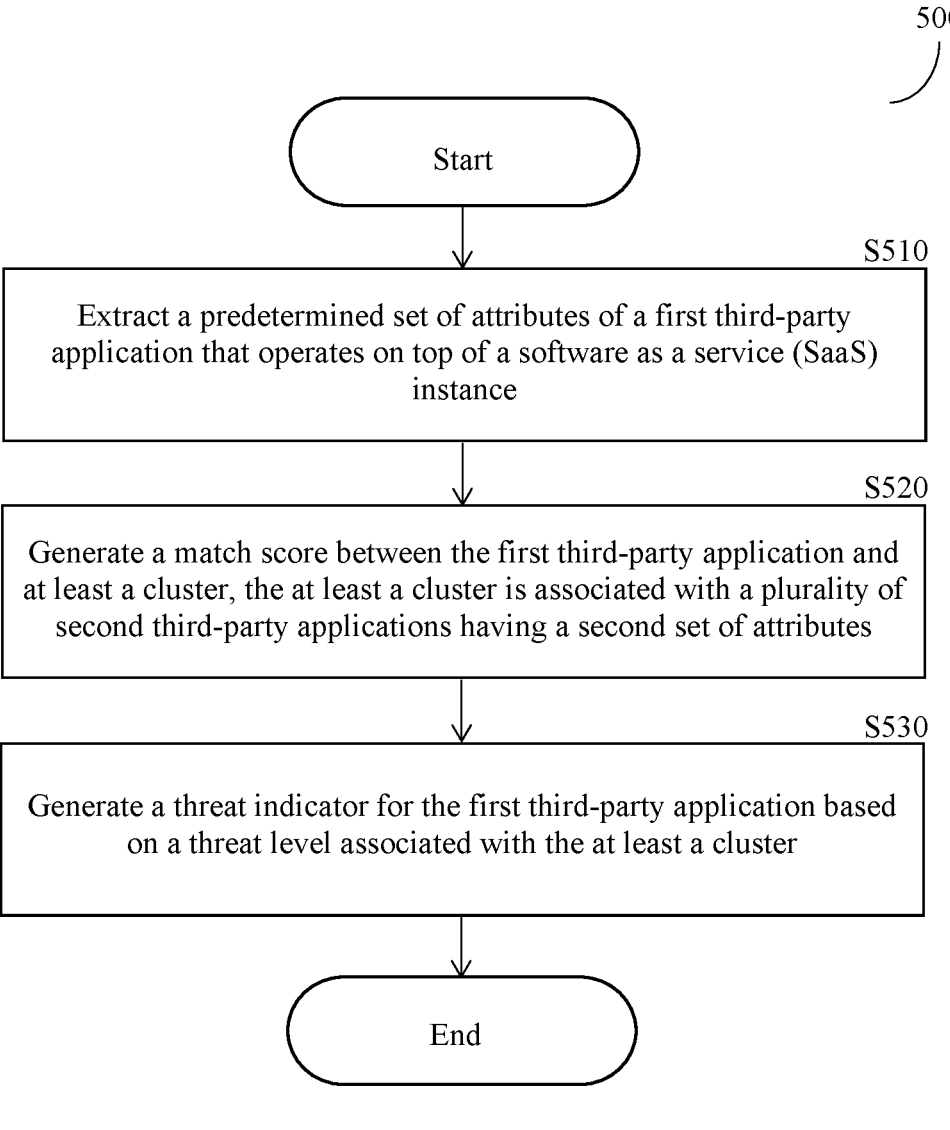

500

Start

S510

Extract a predetermined set of attributes of a first third-party application that operates on top of a software as a service (SaaS) instance

S520

Generate a match score between the first third-party application and at least a cluster, the at least a cluster is associated with a plurality of second third-party applications having a second set of attributes

S530

Generate a threat indicator for the first third-party application based on a threat level associated with the at least a cluster End

FIGURE 5

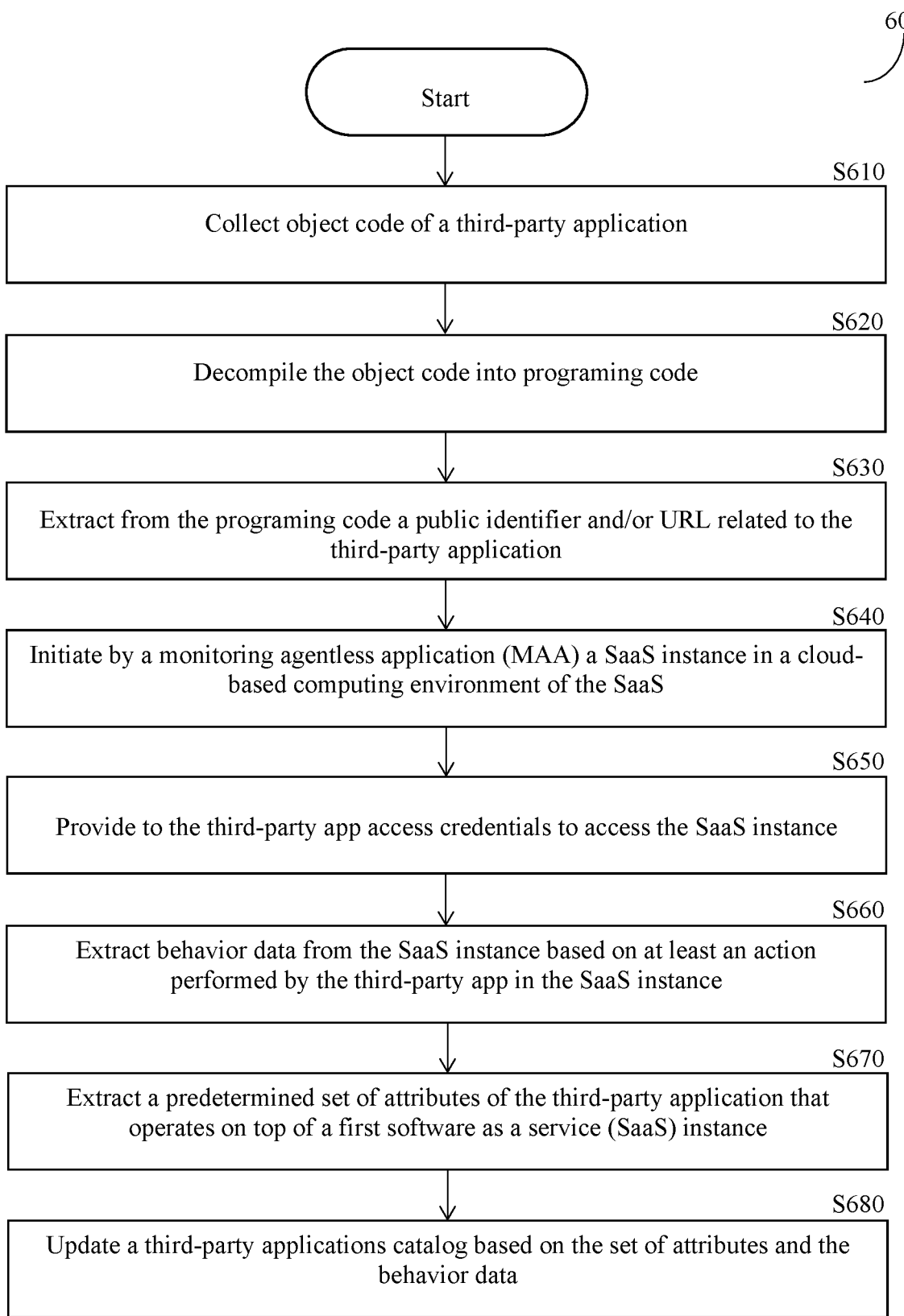

600

Start

S610
Collect object code of a third-party application

S620
Decompile the object code into programing code

S630
Extract from the programing code a public identifier and/or URL related to the third-party application S640
Initiate by a monitoring agentless application (MAA) a SaaS instance in a cloud-based computing environment of the SaaS S650
Provide to the third-party app access credentials to access the SaaS instance S660
Extract behavior data from the SaaS instance based on at least an action performed by the third-party app in the SaaS instance S670
Extract a predetermined set of attributes of the third-party application that operates on top of a first software as a service (SaaS) instance S680
Update a third-party applications catalog based on the set of attributes and the behavior data

FIGURE 6

SYSTEM AND METHOD THEREOF FOR ENHANCED COLLECTION OF DATA OF THIRD-PARTY APPLICATIONS

TECHNICAL FIELD

This disclosure generally relates to cyber security, and more particularly to a system and methods thereof for enhanced collection of data of third-party applications.

BACKGROUND

Small and medium-sized enterprises (SMEs) and large enterprises hold sensitive and confidential information related to their business, clients, and the like. The information is sometimes stored in simple folders in a computerized environment, such as an enterprise network.

Nowadays, as enterprises get bigger, their systems and networks are more and more exposed to cyberthreats. According to Kaspersky over 300,000 different malware variants are detected in a single day.

One of the common cyberthreats on such organizations is based on third-party applications. While some third-party applications may be harmless, some of them may be malicious and used by their owners to perform malicious actions.

It would therefore be advantageous to provide a solution that would overcome the challenges noted above.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

FIG. 3 is a flowchart of a method for collecting data of third-party applications, according to an embodiment.

FIG. 5 is a flowchart of a clustering-based method for generating a threat indicator for a third-party application, according to an embodiment.

FIG. 6 is a flowchart of a method for collecting data of third-party applications and updating a third-party applications catalog, according to an embodiment.

DETAILED DESCRIPTION

Figure 1:
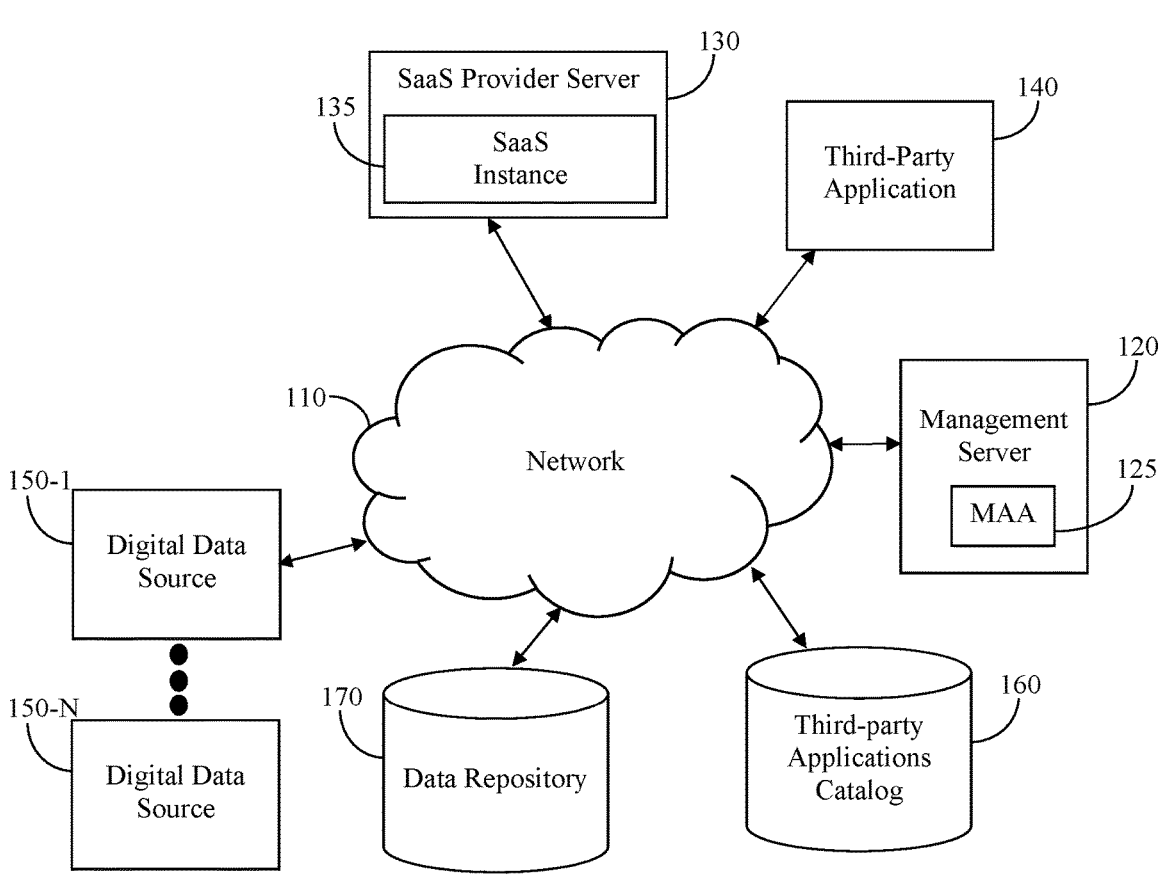
FIG. 1 is a schematic diagram of a computing architecture utilized to describe the various embodiments disclosed herein.

It is important to note that the embodiments disclosed by the disclosure are only examples of the many advantageous uses of the innovative teachings herein. In general, statements made in the specification of the present application do not necessarily limit any of the various claimed disclosures. Moreover, some statements may apply to some inventive features but not to others. In general, unless otherwise indicated, singular elements may be in plural and vice versa with no loss of generality. In the drawings, like numerals refer to like parts through several views.

The disclosed system and methods are used for collecting information of third-party applications. A search is performed for detecting uniform resource locator (URL) that is associated with a web page allowing to download at least one third-party application. The search is based on URL patterns that are previously and uniquely determined for each digital data source. An identifier, e.g., client ID, of a third-party application is extracted from each URL of a web page which allows to download a third-party application. Then, the system initiates a software as a service (SaaS) instance in a cloud-based computing environment. The system provides to the third-party application access credentials to access the SaaS instance and extract attributes and behavior data of the third-party application based on at least the actions performed by the third-party application in the SaaS instance.

FIG. 1 is a network diagram of a computing architecture utilized according to various disclosed embodiments. In the example network diagram 100, a management server 120, a monitoring agentless application (MAA) 125, a software as a service (SaaS) provider server 130, a SaaS instance 135, a third-party application 140, a digital web source 150 and a third-party app catalog 160 are communicatively connected via a network 110. The network 110 may be but is not limited to, a wireless network, a local area network (LAN), a wide area network (WAN), the worldwide web (WWW), the Internet, similar networks, and any combinations thereof.

The management server 120 is a computing component that may include a combination of hardware layer and a software layer. The management server 120 may be configured to cause execution of actions as further discussed herein below. The components of the management server 120 are described in more detail with respect to FIG. 2.

The monitoring agentless application (MAA) 125 is a software that is used for detecting and monitoring actions that have been performed by a third-party application in an instance of the SaaS, as further described herein below.

In an embodiment, the MAA 125 is also utilized for extracting attributes of third-party applications (e.g., SaaS add-ons) that operates on top of a software as a service (SaaS) instance. Such attributes may include for example and without limitation, the agentless third-party application name, type of permissions provided to the agentless third-party application, number of permissions the agentless third-party application received, the source of the agentless third-party application, the publisher of the agentless third-party application, whether the agentless third-party application has a security policy, privacy policy, and so on. The SaaS provider server 130 may include an application programming interface (API) allowing the MAA 125 to detect agentless third-party applications (e.g., SaaS add-ons) and extract attributes associated with the third-party application.

The SaaS provider server 130 is a computing environment which provides a software service, such as customer relationship management (CRM), identity and access management (IAM), etc. SaaS is a software licensing and delivery model in which software is licensed on a subscription basis and is centrally hosted. SaaS is also known as web-based or web-hosted software. SaaS applications are typically accessed by users using a thin client, e.g., via a web browser. Users usually provide user information when creating a new user account (e.g., when signing in). User information may include for example, name, address, email address, telephone number, age, and the like. A SaaS provider may be for example and without limitation, Facebook®, Google®, Salesforce®, and the like. While SaaS providers provide services such as web mail, customer relationship management (CRM), identity management, etc., third-party applications (i.e., SaaS add-ons) provide services on top of the services provided by the SaaS provider such as, email arrangement services on top of web mail service, CRM business insights services on top of CRM service, and so on.

The SaaS instance 135 is an application environment of a SaaS provider that is created for and associated with a unique entity (e.g., a user account, service account, and the like). The SaaS instance 135 may be implemented as a container operating in a cluster deployed by the SaaS provider server 130. For example, a specific user account at Gmail® is a SaaS instance.

The third-party application 140 may be associated with a third-party entity which may provide a legitimate service or try to run malicious processes within a computerized environment. The third-party application 140 may be referred to as a SaaS add-on. As opposed to other many different types of malicious activities, malicious applications, malicious files, or the like, the third-party application 140 is not downloaded to a computer, a server, or any other similar environments. As further discussed herein below, the third-party application 140 may receive access credentials to access an instance of a SaaS. Thus, using the abovementioned monitoring agentless application 125, which creates a simulated SaaS instance and is configured to monitor actions that are associated with or performed by the third-party application, behavior data associated with the third-party application 140 can be extracted and monitored in a supervised environment. Behavior data is the representation of the activities performed by, or with respect to, the third-party application 140. Behavior data may also include behavior information. The behavior data may be indicative of, for example, communications and interactions occurred between the third-party application 140 and at least a principal or a resource, such as simulated databases, a simulated e-mail accounts, simulated files, and the like. The third-party application 140 may be a SaaS add-on, such as a SaaS add-on to a webmail service, such as Gmail, a SaaS add-on to a CRM service, such as Salesforce, etc. Third-party applications receive access to SaaS instances after a user provides for example, sign in or log in information (e.g., username and password) through one of the SaaS providers in which the user has an account. The SaaS provider provides the third-party application with access permissions to access resources and data which the SaaS provider stores.

The digital web source 150-1 through 150-N is a digital platform such as website, web page, a search engine, a database, and the like. The digital web source may store data that is associated with third-party applications, such as but not limited to, URLs of web pages allowing to download third party applications.

The third-party application catalog 160 is a database used for storing data about third-party applications. The data stored in the third-party application catalog 160 may be indicative of the threat level of each third-party application. It should be noted that the data stored in the third-party application catalog 160 may be updated from time to time based on new detected properties or activities of the third-party applications, as further discussed below.

A data repository 170 may be communicatively coupled with the management server 120 via the network 110 or embedded within the management server 120. The data repository 170 may be for example, a storage device containing thereon a database (e.g., a graph DB, a relational DB), a data warehouse, and the like, that may be used for storing simulated information (e.g., to be deployed at the SaaS instance), records of behavior data of the third-party application (e.g., monitor log), and the like.

In an embodiment, and as further described in greater detail above and below, the disclosed system and methods are used for automatically detecting third-party applications, generate a safe environment in which the agentless third-party applications' attributes and behavior can be monitored, and optionally determine a threat level for each third-party application. Then, the disclosed system and methods create a third-party applications' data repository which stores data such as attributes and risk level about each monitored third-party application.

Figure 2:
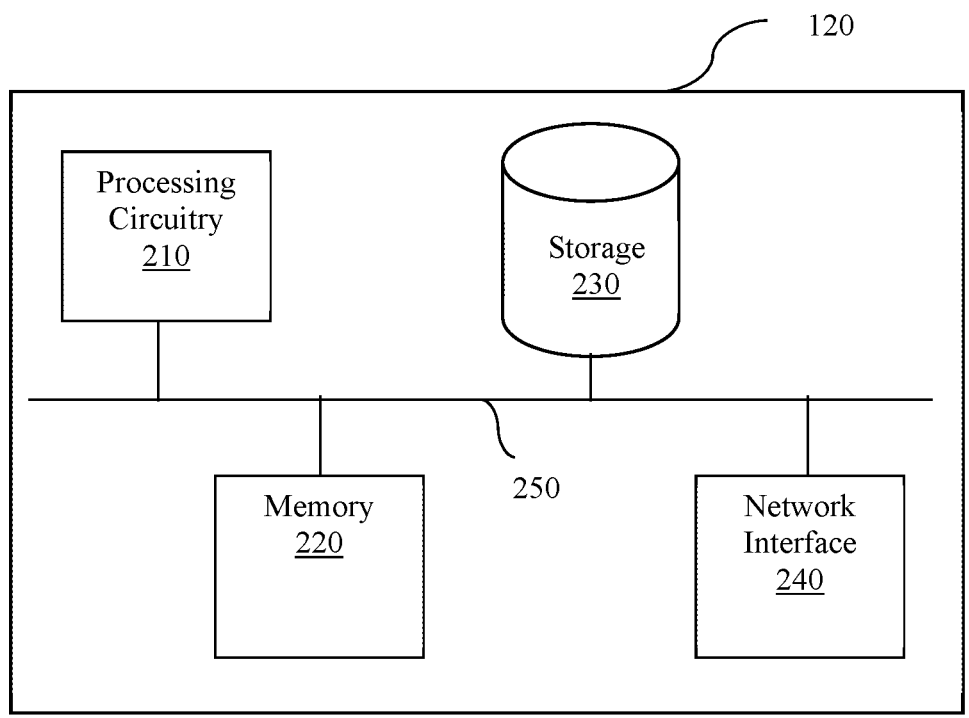
FIG. 2 is a schematic diagram of a management server according to an embodiment.

FIG. 2 is an example schematic diagram of a management server 120 according to an embodiment. The management server 120 includes a processing circuitry 210 coupled to a memory 220, a storage 230, and a network interface 240. In an embodiment, the components of the management server 120 may be communicatively connected via a bus 250.

The processing circuitry 210 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 220 may be volatile (e.g., RAM, etc.), non-volatile (e.g., ROM, flash memory, etc.), or a combination thereof. In one configuration, software for implementing one or more embodiments disclosed herein may be stored in the storage 230. In another configuration, the memory 220 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 210, cause the processing circuitry 210 to perform the various processes described herein.

The storage 230 may be a magnetic storage, a solid-state storage, an optical storage, and the like, and may be realized, for example, as flash memory or other memory technology, or any other medium which can be used to store the desired information.

The network interface 240 allows the management server 120 to communicate with, for example, the components of the computing architecture of FIG. 1 (e.g., the SaaS provider server 130, the third-party application 140, the digital sources 150, the third-party application catalog 160, the data repository 170) for the purpose of, for example, transmitting data, receiving data, or the like. It should be understood that the embodiments described herein are not limited to the specific architecture illustrated in FIG. 2, and other architectures may be equally used without departing from the scope of the disclosed embodiments.

In an embodiment, actions that have been performed by a third-party application (e.g., SaaS add-on) in an instance of the SaaS are detected and monitored by the MAA 125. In addition, attributes of the third-party application (e.g., SaaS add-on) that operates on top of a SaaS instance, may be extracted by the MAA 125. Attributes may include for example and without limitation, the agentless third-party application name, type of permissions provided to the agentless third-party application, number of permissions the agentless third-party application received, the source of the agentless third-party application, the publisher of the agentless third-party application, whether the agentless third-party application has a security policy, privacy policy, and so on.

In an embodiment, the management server 120 searches in at least one digital web source (such as the digital web source 150) of a plurality of digital data sources for a uniform resource locator (URL) that is associated with a web page allowing to download or connect at least one third-party application. A URL (also known as web address) is a reference to a web resource that specifies its location on a computer network and a mechanism for retrieving it. URLs occur most commonly to reference web pages. As a non-limiting example, Google® search engine is a digital web source. A web page allowing to download a third-party application may be a consent web page by which users can verify their identity using their Gmail® accounts, Facebook® accounts, etc.

In an embodiment, the search is based on a predetermined URL pattern which is uniquely associated with a respective digital web source of the plurality of digital data sources. A URL pattern is a repetitive sequence of characters and/or symbols and/or numbers, that is used by a specific digital web source and characterizes the specific digital data source's URLs. It should be noted that URLs differ from one to another, however the URL pattern is repetitive portion of the URL. It should be noted that this is not the full URL but only a URL pattern which is a repetitive sequence of characters and/or symbols and/or numbers which is used by Google in the above example. That is, the same URL pattern is used by Google to allow users to authenticate their identity when downloading or connecting third-party applications such as Trello®, Spotify®, Dropbox®, and the like. As noted above, different web sources have different URL patterns. For example, as opposed to the abovementioned Google's URL pattern, Microsoft®, Apple®, and the like have their own unique URL pattern. For example, Apple's URL pattern (that is associated with a web page allowing to download third-party applications) may be "appleid.apple-.com/auth/authorize". As another example, Microsoft's URL pattern (that is associated with a web page allowing to download third-party applications) may be: "login.microsoftonline.com/common/oauth2/v2.0/authorize".

As noted above, the search is performed based on URL patterns, such as the above example URL patterns. In addition, the search further includes automatically creating, by the management server 120, an addition to the URL pattern. The addition may include for example, characters, numbers, symbols, or a combination thereof, in order to detect web pages allowing to download third-party applications. The addition may be generated randomly or based on a predetermined technique.

In an embodiment, after a URL of web page that allows to download third-party applications is detected, the management server 120 extracts from the URL an identifier, e.g., client ID. A client ID is a public identifier for applications (e.g., the third-party application) that assists with client/server authentication. After the identifier of the third-party application is extracted, the management server 120 uses the identifier (e.g., client ID) for extracting behavior data and attributes of the third-party application.

In an embodiment, the monitoring agentless application (MAA) 125 that is executed on the management server 120 (shown in FIG. 1), initiates a software as a service (SaaS) instance 135 in a cloud-based computing environment of a SaaS provider. It should be noted that the SaaS instance may be previously initiated by, for example, the management server 120, an initiating server (not shown), or any other similar computing device. SaaS is a software licensing and delivery model in which software is licensed on a subscription basis and is centrally hosted. SaaS is also known as web-based or web-hosted software. For example, a SaaS provider may be for example and without limitation, Facebook®, Google®, Salesforce®, and the like. SaaS applications are typically accessed by users using a thin client, e.g., via a web browser. The SaaS instance 135 is an application environment of a SaaS provider that is created for and associated with a unique entity (e.g., a user account, service account, and the like). The SaaS instance 135 may be implemented as a container operating in a cluster deployed by the SaaS provider server 130. For example, a specific user account at Salesforce® is a SaaS instance, an organization account of a business or a company is a SaaS instance, and so on. In an embodiment, the MAA 125 may communicate with the SaaS provider server 130 via an application programing interface (API) for the purpose of initiating the instance of the SaaS.

For example, a specific user account at Gmail® may be referred to as a SaaS instance. In an embodiment, initiating the SaaS instance 135 includes generating by the MAA 125 simulated information and resources for the SaaS instance. Generating simulated information and resources may include generating simulated files, simulated email messages, simulated documents, simulated contacts' lists, simulated databases, simulated email accounts, and the like, and place the simulated information in different workloads (e.g., nodes, database, virtual machines) to simulate an authentic computerized environment. It should be noted that generating the simulated information may also include generating and placing content in documents, files, messages, etc. such that the simulated information may be authentic as possible. For example, the content of a certain simulated file may be generated based on the name of the folder in which the file is stored. However, the simulated information does not include confidential or sensitive information. By generating the simulated information for the SaaS instance 135 (i.e., for the monitored cloud-based environment), an environment which imitates an authentic cloud-based environment is created. As a non-limiting example, initiating the SaaS instance may include generating and placing in one or more workloads simulated information that imitates a computerized enterprise network which includes 4,000 email accounts, 500,000 email messages, 20,000 folders, 300,000 files, 3 databases, and so on. In a further embodiment, generating the simulated information may also include generating one or more bots. A bot is software program that operates automatically and performs for example, repetitive tasks, artificial intelligence (AI) based tasks simulating human actions, randomly generated tasks, and so on. The bots may be configured to communicate (e.g., send and receive data) with each other, with other sources (e.g., databases), etc. in order to imitate an authentic computerized cloud-based environment.

In an embodiment, after a third-party application (or a suspected third-party application) is detected based on the identifier extracted from the URL (i.e., the extracted client ID), the MAA 125 provides to third-party application access credentials to access the SaaS instance 135. Access credentials may include for example, username, password, hashed password, token, and the like. In an embodiment, the MAA 125 communicates with the third-party application 140 and provides the access credentials to the third-party application 140. The third-party application 140 may be referred to as a SaaS add-on. As opposed to other many different types of malicious activities, malicious applications, malicious files, or the like, the third-party application 140 is not downloaded to a computer, a server, or any other similar environments. The third-party application 140 may be a SaaS add-on, such as a SaaS add-on to Gmail, a SaaS add-on to Salesforce, etc.

Generally, agentless third-party applications (i.e., SaaS add-on) receive access to user's data and/or environment after a user provides sign in or log in information (e.g., username and password) through one of the SaaS providers in which the user has an account. According to one embodiment of the disclosed system and method, the MAA 125 creates the SaaS instance 135 using the SaaS provider cloud-based environment by providing the SaaS provider server 130 with, for example, sign in or log in information (e.g., username and password). Thus, when the third-party application 140 receives the access credentials to access the SaaS instance 135, the SaaS provider server 130 provides the third-party application 140 with access entitlements to access resources and data which the SaaS provider server 130 stores.

In an embodiment, providing the access credentials may be achieved by providing, e.g., by the MAA 125, to a SaaS provider server 130 sign in or log in information, which simulates authentic user sign in or log in information, and a unique authentication token that is generated by the SaaS provider server 130 with respect to a specific third-party application (e.g., SaaS add-on). Thus, the third-party application 140 receives access entitlements to access resources and data which the SaaS provider server 130 stores.

For example, a SaaS add-on (e.g., the third-party application 140) presents a log in screen by which log in can be performed using a user Google® account. Then, the MAA 125 inserts user sign in or log in information (that is associated with a simulated user) such as username and password, or hashed password, in the corresponded fields. According to the same example, the SaaS add-on may previously request and receive a unique authentication token from the SaaS provider server (e.g., Google). The unique authentication token allows the SaaS provider server to verify the identity of the specific add-on (i.e., third-party application) when the add-on sends a request to access to user information stored in SaaS provider server (e.g., Google).

In an embodiment, the MAA 125 that is executed on the management server 120 extracts behavior data from the SaaS instance 135 based on at least an action that is associated with or performed by the third-party application 140 in the SaaS instance. As noted above, the SaaS instance is a cloud-based environment that is created and monitored by the MAA 125. Therefore, the actions performed by the third-party application 140 may be identified rapidly and accurately. It should be noted, the SaaS instance is isolated from an authentic cloud-based computing environment (e.g., real organization cloud-based computing environment), and therefore the task of monitoring the actions and interactions performed by and/or associated with the SaaS add-on (i.e., the third-party application 140) in the SaaS instance, may consume less processing efforts and therefore save precious processing time. Behavior data is the representation of the activities performed by, or with respect to, the third-party application 140 (e.g., SaaS add-on). Behavior data may also include behavior information. The behavior data may be indicative of, for example, communications and interactions occurred between the third-party application 140 and at least a principal or a resource such as simulated databases, a simulated e-mail accounts, simulated files, and the like. That is, when the third-party application 140 receives access to the SaaS instance 135 (which includes simulated resources and information that is generated by the MAA 125), the third-party application 140 may perform many actions, such as for example and without limitation, open simulated folders, open simulated files, read simulated information, write information into simulated files, communicate with simulated databases and endpoint devices, and the like. In an embodiment, the behavior data may be referred to as inter-actions performed between the third-party application 140 and one or more workloads (e.g., databases, nodes, user accounts, etc.). Monitoring the behavior data may be achieved by extracting, using the MAA 125, information from, for example, log in logs, audit log, diff module, and the like. In a further embodiment, extracting behavior data may be performed using, for example, a packet analyzer (e.g., a sniffer which is a computer software for intercepting traffic of a network), a scraper, and the like. It should be noted that by extracting the behavior data associated with the third-party application 140, IP addresses, proxy network, etc. that are associated with the third-party application 140 may be detected.

According to another embodiment, a monitor log that contains the behavior data may be generated by, e.g., the MAA 125. The generated monitor log may include a textual summary of the actions and interactions performed by the third-party application 140 (e.g., SaaS add-on) and/or between the third-party application 140 and one or more principals and resources, in the SaaS instance 135. Accord-ing to one embodiment, the generated monitor log may include a portion of the information that was extracted from, for example, log in logs, audit log, diff module, or the like. The monitor log facilitates determination of the actions and interaction that has been executed by the third-party appli-cation 140 (e.g., SaaS add-on) in the SaaS instance 135. In a further embodiment, the monitor log contains attributes of the third-party application.

The monitor log may include behavior data that may be indicative of: (a) from where the third-party application 140 communicates (e.g., based on IP address); (b) which entity developed the third-party application 140; (c) which entity owns the third-party application 140; (d) where does the server that operates the third-party application 140 located; (e) which type of data the third-party application 140 collects; (f) how frequently the third-party application 140 collects data; (g) the identity of the entity that operates the third-party application 140 (e.g., script, browser, bot, code, and the like); (h) which of the simulated information was triggered (e.g., opened, saved, etc.) by the third-party appli-cation 140; (i) whether or not the third-party application 140 created new keys, changed configuration, performed lateral movements within the monitored cloud-based environment of the SaaS instance 135, and so on. It should be noted that the aforementioned list only describes few examples of behavior data items and many other behavior data items may be detected based on monitoring the behavior data without departing from the scope of the disclosure.

In an embodiment, the monitor log may be stored in the third-party applications catalog 160 (of FIG. 1). As noted above, the stored monitor log may include textual represen-tation of the behavior data which may be used for detecting, for example, suspicious patterns in the behavior data, similar behavior data that may be detected in other computerized environments (e.g., in different companies), and so on. For example, the monitor log of a first third-party application (e.g., SaaS add-on) indicates that the frequency with which the third-party application communicates with simulated workloads (e.g., simulated databases and simulated endpoint devices) in the SaaS instance, is relatively high compared to an average frequency measured with respect to 1,000 different agentless third-party applications having at least 8 similar attributes. It should be noted that in order to determine that a suspicious behavior, patten, etc. is detected, multiple parameters (and their values) of the behavior data may be analyzed and crosschecked.

It should be noted that the monitor log may be updated from time to time when new behavior data is detected, and therefore the third-party applications catalog 160 (of FIG. 1) may be updated respectively.

In an embodiment, the MAA 125 determines whether the extracted attributes and/or the behavior data of the third-party application provide amount of data that is above a predetermined threshold value about the third-party application. The predetermined amount of data may include for example three parameters about the third-party application, such as the name, number of permissions, the entity which developed the third-party application. In a further embodiment, the MAA 125 may be configured to collect from one or more sources complementary data about the third-party application upon determination that the extracted attributes and the behavior data provide amount of data that is below the predetermined threshold value. The sources may be for example, databases, web sources, and the like.

According to a further embodiment, the third-party application (e.g., SaaS add-on) may be associated with at least a first cluster of a plurality of clusters of agentless third-party applications based on the monitored behavior data. Each of the plurality of clusters may be differentiated based on, for example, (a) type of the third-party applications (e.g., entertainment, utility, educational); (b) common developer of the third-party applications; (c) common current owner of the third-party applications, and so on.

In a further embodiment, the clusters may be stored in a data repository (e.g., the data repository 170) and used by the MAA 125 for the purpose of, for example, determining if the third-party application is malicious or not, based on the cluster(s) to which the third-party application relates.

In an embodiment, the MAA 125 that is executed on the management server 120 extracts a predetermined set of attributes of the third-party application 140 that operates on top of the SaaS instance. The predetermined set of attributes may be extracted based on a close list of attributes' types that were previously classified as attributes having a highest contribution level to indicating a threat indicator (e.g., threat level) of a third-party application (e.g., a SaaS add-on). In order to extract at least a portion of the predetermined set of attributes the MAA 125 may scan data associated with the third-party application, for example, by accessing an API of the SaaS instance and requesting data, where the requests are based on an array such as a vector, a schema and the like, that contains at least a portion of the attributes. Each attribute in the array may be associated with a parameter and a value related thereto. For example, a first parameter may be "Application Name" and the value related thereto is "Spotify®", a second parameter may be "permissions' types" and the values related thereto are "access calendar", "access contacts list", and so on.

In an embodiment, each attribute may be associated with a weight indicating the importance level of the specific attribute in computing the risk associated with using the third-party application (e.g., SaaS add-on). The weight may be a numeric value between "0" to "1". The value of "0" represents the lowest value indicating that the attribute has no effect on the calculation of the risk, and "1" represents the highest value indicting that the attribute has the highest effect on the calculation of the risk of using the third-party application (e.g., SaaS add-on). For example, a first attribute indicating the number of permissions the third-party application has may be associated with a relatively high weight such as 0.85, while a second attribute indicating the name of the third-party application may be associated with a relatively low weight such as 0.15.

It should be noted that an initial weight of each attribute may be previously determined by, for example, the MAA 125. Determination of the initial weight may be achieved by detecting the weights that are associated with the attributes of each third-party application that was previously monitored. In a further embodiment, the initial weight of a certain attribute(s) of a third-party application may be affected, and consequently adjusted, based on the weights of other attributes of the same third-party application. For example, taken separately, each of ten different attributes may be associated with a relatively low initial weight. However, when the ten attributes are detected as mutual attributes of the same third-party application, one or more of the weights of the ten attributes, may be increased.

FIG. 3 is an example flowchart 300 of a method for extracting behavior data of third-party applications, according to an embodiment.

At S310, a search is performed in a digital web source for a URL of a web page which allows to download a third-party application. The search is performed based on a predetermined uniform resource locator (URL) pattern. The URL pattern is uniquely associated with a respective digital web source of the plurality of digital data sources. A URL pattern is a repetitive sequence of characters and/or symbols and/or numbers, that is used by a specific digital web source and characterizes the specific digital data source's URLs. Third-party applications provide services on top of the services provided by software as a service (SaaS) providers such as, email arrangement services on top of web mail service, CRM business insights services on top of CRM service, and so on.

At S320, an identifier (i.e., client ID) of a respective third-party application is extracted from the URL. The client ID is a public identifier for applications (e.g., the third-party application) that assists with client/server authentication.

At S330, the monitoring agentless application (MAA) 125 that is executed on the management server (shown in FIG. 1), initiates a software as a service (SaaS) instance in a cloud-based computing environment of a SaaS provider. The SaaS instance is an application environment of a SaaS provider that is created for and associated with a unique entity (e.g., a user account, service account, and the like). The SaaS instance may be implemented as a container operating in a cluster deployed by the SaaS provider server, as further discussed in greater detail with respect to FIG. 2.

At S340, the MAA 125 provides to the third-party application access credentials to access the SaaS instance. Access credentials may include for example, username, password, hashed password, token, and the like. It should be noted that, as opposed to other many different types of malicious activities, malicious applications, malicious files, or the like, the third-party application is not downloaded to a computer, a server, or any other similar environment. Thus, when the third-party application receives access credentials to access the SaaS instance, the SaaS provider server provides the third-party application with access entitlements to access resources and data which the SaaS provider server stores.

At S350, the MAA that is executed on the management server extracts behavior data of the third-party application from the SaaS instance based on at least an action that is associated with or performed by the third-party application in the SaaS instance. Behavior data is the representation of the activities performed by, or with respect to, the third-party application. As noted above, the SaaS instance is a cloud-based environment that is created and monitored by the MAA. The SaaS instance is isolated from an authentic cloud-based computing environment (e.g., real organization cloud-based computing environment), and therefore the task of monitoring the actions and interaction performed by and/or associated with the third-party application in the SaaS instance, may consume less processing efforts and therefore save precious processing time.

Figure 4:
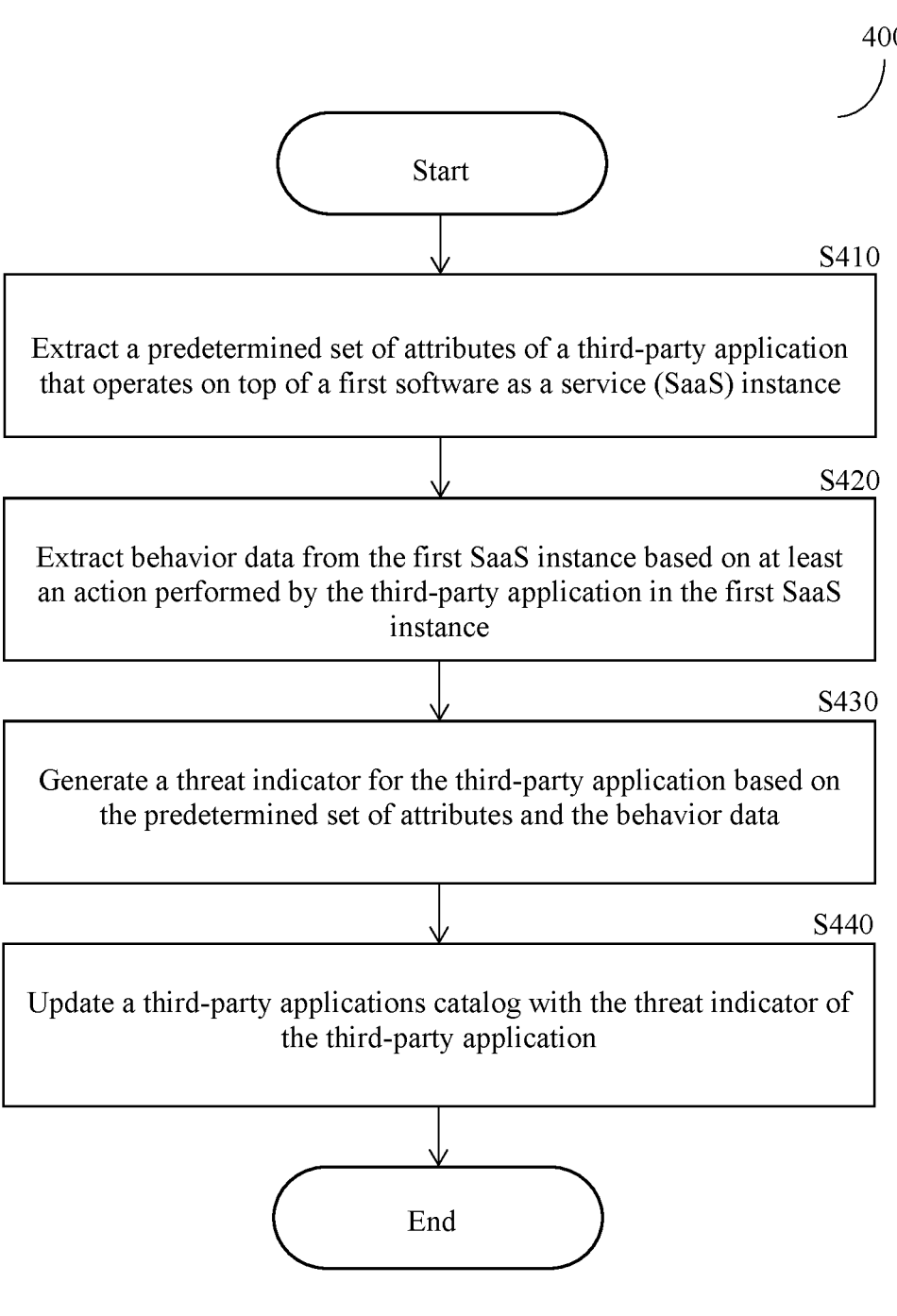
FIG. 4 is a flowchart of a method for generating a threat indicator for a third-party application, according to an embodiment.

FIG. 4 is an example flowchart 400 of a method for generating a threat indicator for a third-party application, according to an embodiment. The method described herein may be executed by the monitoring agentless application (MAA) 125 of FIG. 1.

At S410, a predetermined set of attributes of a third-party application (e.g., the third-party application 140) that operates on top of a service as a software (SaaS) instance, is extracted. The predetermined set of attributes may be extracted based on a close list of attributes' types that were previously classified as attributes having a highest contribution level to indicating a threat indicator (e.g., threat level) of a third-party application (e.g., a SaaS add-on). In order to extract at least a portion of the predetermined set of attributes the MAA 125 may scan data associated with the third-party application, for example, by accessing an API of the SaaS instance and requesting data, where the requests are based on an array such as a vector, a schema and the like, that contains at least a portion of the attributes. Each attribute in the array may be associated with a parameter and a value related thereto. For example, a first parameter may be "Application Name" and the value related thereto is "Spotify®", a second parameter may be "permissions' types" and the values related thereto are "access calendar", "access contacts list", and so on.

In an embodiment, each attribute may be associated with a weight indicating the importance level of the specific attribute in computing the risk associated with using the third-party application (e.g., SaaS add-on). The weight may be a numeric value between "0" to "1". The value of "0" represents the lowest value indicating that the attribute has no effect on the calculation of the risk, and "1" represents the highest value indicting that the attribute has the highest effect on the calculation of the risk of using the third-party application (e.g., SaaS add-on). For example, a first attribute indicating the number of permissions the third-party application has may be associated with a relatively high weight such as 0.85, while a second attribute indicating the name of the third-party application may be associated with a relatively low weight such as 0.15.

It should be noted that an initial weight of each attribute may be previously determined by, for example, the MAA 125. Determination of the initial weight may be achieved by detecting the weights that are associated with the attributes of each third-party application that was previously monitored. In a further embodiment, the initial weight of a certain attribute(s) of a third-party application may be affected, and consequently adjusted, based on the weights of other attributes of the same third-party application. For example, taken separately, each of ten different attributes may be associated with a relatively low initial weight. However, when the ten attributes are detected as mutual attributes of the same third-party application, one or more of the weights of the ten attributes, may be increased.

At S420, behavior data of third-party application is extracted from a SaaS instance based on at least an action performed by the third-party application in the SaaS instance. The SaaS instance is an application environment of a SaaS provider that is created for and associated with a unique entity (e.g., a user account, service account, and the like). The SaaS instance may be implemented as a container operating in a cluster deployed by the SaaS provider server 130. For example, a specific user account at Gmail® is a SaaS instance. Behavior data is the representation of the activities performed by, or with respect to, the third-party application 140. Behavior data may also include behavior information. The behavior data may be indicative of, for example, communications and interactions occurred between the third-party application and at least a principal or a resource, such as simulated databases, a simulated e-mail accounts, simulated files, and the like. As a non-limiting example, the behavior data may indicate how frequently the agentless third-party application 140 collects the data, which part of the simulated information was triggered, whether the agentless third-party application 140 created new keys, changed configuration, and so on. A monitor log may include all the data summarizing the actions and interactions performed by the third-party application in the SaaS instance. According to one embodiment, the monitor log may include at least a portion of the data that was extracted from, for example, log in logs, audit log, diff module, or the like. The monitor log facilitates determination of the actions and interactions that are associated with the third-party application in the SaaS instance.

At S430, a threat indicator is generated for the third-party application based on the extracted set of attributes and the behavior data. A threat indicator is a value that is indicative of the risk involved in using the third-party application (e.g., SaaS add-on). The threat indicator may be implemented as a threat score, threat level, a combination thereof, and the like. A threat score may indicate whether a risk exists or not, and so there may be two scores, score of "0" indicating that no threat is detected, and score of "1" indicating that threat is detected. A threat level may include, for example, a ranking between "1" to "5", where "1" is the lowest ranking indicting that the threat associated with using the third-party application (e.g., SaaS add-on) is low, and "5" is the highest threat level indicating that the threat associated with using the third-party application (e.g., SaaS add-on) is high.

A threshold may be previously determined and used for distinguishing between different threat levels. Such threshold may be for example, "3" where "5" is the highest threat level. Thus, based on determination that the predetermined threshold was crossed, one or more actions may be automatically performed by, for example, the management server 120 (e.g., using the MAA 125). Such actions may include for example, generating a report about the determined threat level. The report may include, among other things, the root cause for the determined threat level. It should be noted that the report may be generated for each of the detected third-party applications (e.g., SaaS add-ons).

In an embodiment, generation of the threat indicator may be achieved by applying one or more machine learning (ML) algorithms to the extracted set of attributes and the extracted behavior data. The ML algorithm(s) may be adapted to determine the threat indictor (e.g., threat level and/or threat score) of the third-party application (SaaS add-on) based on the attributes and the behavior data associated with the third-party application. In a further embodiment, the above-mentioned weight of each attribute may also be considered by the ML when determining the threat indicator.

According to another embodiment, generation of the threat indicator may be achieved using a set of rules. For example, a rule may state that when (a) the number of permissions the third-party application (e.g., SaaS add-on) has is over ten; (b) the third-party application (e.g., SaaS add-on) has no privacy policy; (c) the third-party application (e.g., SaaS add-on) performed over 10 write commands between 2 am to 5 am in the SaaS instance (i.e., monitored cloud-based environment), the threat level is relatively high. In a further embodiment, the set of rules may also consider the weight of each attribute of the third-party application (e.g., SaaS add-on) when determining the threat indicator.

At S440, a third-party applications catalog is updated with the threat indicator of the third-party application. It should be noted that since the threat indicator of a third-party application may be changed through time, the third-party applications catalog may be updated respectively.

FIG. 5 is an example flowchart 500 of a clustering-based method for generating a threat indicator for a third-party application, according to an embodiment.

At S510, at least a portion of a first set of predetermined attributes of a first third-party application that operates on top of a software as a service (SaaS) is extracted. The first set of predetermined attributes may include, for example and without limitation, the first third-party application's (e.g., SaaS add-on) name, permissions provided to the first third-party application, number of permissions the first third-party application received, the source of the first third-party application, the publisher of the first third-party application, whether the first third-party application includes a security policy and/or a privacy policy, and so on. In an embodiment, each attribute may be associated with a weight indicating the importance level of the specific attribute in computing the risk associated with using the third-party application (e.g., SaaS add-on). The weight may be a numeric value between "0" to "1". The value of "0" represents the lowest value indicating that the attribute has no effect on the calculation of the risk, and "1" represents the highest value indicting that the attribute has the highest effect on the calculation of the risk of using the first third-party application. In order to extract at least a portion of the set of attributes the monitoring agentless application (MAA) 125 of FIG. 1, may perform a search through an array such as a vector, a schema and the like, that contains at least a portion of the attributes. Each attribute in the array may be associated with a parameter and a value related thereto. For example, a first parameter may be "Application Name" and the value related thereto is "Spotify®", a second parameter may be "permissions' types" and the values related thereto are "access calendar", "access contacts list", and so on. It should be noted that the MAA 125 may be configured to interface with an application programming interface (API) of the SaaS, which is operated by the SaaS provider server 130, in order to detect third-party applications' attributes. More than one third-party application may be detected as operating on top of the SaaS and so, the methods described herein may be implemented such that multiple third-party applications may be detected and processed in parallel to determine their threat level.

At S520, a match score between the first third-party application (e.g., SaaS add-on) and at least a cluster is generated. Each cluster is associated with a plurality of second third-party applications (e.g., SaaS add-ons) having a second set of attributes. The match score is a ranking representing the association level between the first third-party application and one or more clusters that contain a plurality of second third-party application and second set of attributes related thereto. The match score may be determined by comparing values of the first set of attributes of the first third-party application to values of the attributes associated with each cluster having at least a second set of attributes. The match score may be a ranking between "1" to "10", where "1" is the lowest ranking indicting that the association level between the first agentless third-party application and a specific cluster is low, and "10" is the highest ranking indicting that the association level between the first third-party application and a specific cluster is high, for example. A threshold may be previously determined and used for distinguishing between different association levels. Such threshold may be for example, "7" where "10" is the highest association level. Thus, the first third-party application may be associated with more than one cluster when the match score (e.g., association level) between the first third-party application and more than one cluster crosses the predetermined threshold. For example, the match score may be determined as relatively high when the first set of attributes of the first third-party application and the second set of attributes of the second third-party applications, that are stored in a first cluster, have more than 15 attributes in common. Such common attributes may be, for example and without limitation, the third-party application name, permissions provided to the third-party application, number of permissions the third-party application received, the source of the third-party application, the publisher of the third-party application, whether the agentless third-party application includes a security policy and/or a privacy policy, and so on.

In an embodiment, each cluster is associated with a threat level which may be previously generated by the MAA 125 based on the second set of attributes of the second third-party applications that are associated with the cluster. In a further embodiment the threat level of each cluster may be generated by the MAA 125 based on the second set of attributes of the second third-party applications and the weight of each second attribute. For example, a cluster may include 300 second third-party applications having at least a predetermined number of attributes in common indicating that the 300 second third-party applications are malicious, suspicious, and the like. In an embodiment, the threat level of the cluster may be determined using a set of rules. In an embodiment, the threat level of the cluster may be determined by applying a machine learning (ML) algorithm that is adapted to determine the threat level of the cluster based on a set of inputs, such as the second set of attributes of the second third-party applications and the weight related to each attribute of the second set of attributes.

At S530, a threat indicator is generated for the first third-party application based on the threat level associated with the cluster. A threat indicator is a value that is indicative of the risk involved in using the first agentless third-party application. The threat indicator may be implemented as a threat score, threat level, a combination thereof, and the like. A threat score may indicate whether a risk exists or not, and so there may be two scores, score of "0" indicating that no threat is detected, and score of "1" indicating that threat is detected. A threat level may include, for example, a ranking between "1" to "5", where "1" is the lowest ranking indicting that the threat associated with using the first third-party application is low, and "5" is the highest threat level indicting that the threat associated with using the first third-party application is high. Thus, based on the threat level of the cluster to which the first third-party application is associated, the risk involved in using the first third-party application is determined.

According to another embodiment, generation of the threat indicator of the first third-party application is based on the cluster to which the first third-party application is related but not necessarily on the threat level associated with the cluster. That is, even when a first third-party application is associated with a cluster that contains legitimate second third-party applications, the threat indicator of the first third-party application may still be relatively high. For example, all of the second third-party applications of the cluster to which the first third-party application is related, are used by the marketing and sales departments (e.g., of the same organization). However, at least one attribute of the first third-party application indicates that the first third-party application is currently used by an end-point device that is associated with the legal department. According to the same example, in such case the threat level may be relatively high indicating that suspicious activity may occur. And so, consequently, a notification (indicating the threat indicator and the root cause) may be generated and sent to a predetermined server, a report (indicating the threat indicator and the root cause) may be generated, and so on.

FIG. 6 is an example flowchart 600 of a method for collecting data of third-party applications and updating a third-party applications catalog, according to a further embodiment. The method described herein may be executed by the management server 120 and/or the monitoring agentless application (MAA) 125 of FIG. 1.

At S610, an object code of at least one third-party application (such as the third-party application 140 of FIG. 1) is collected from at least one computing environment. Object code is a set of instruction codes that is understood by a computer at the lowest hardware level. Object code is usually produced by a compiler that reads some higher-level computer language source instructions and translates them into equivalent machine language instructions. The object code may be collected from at least one computing environment such as, a database, a website, applications marketplace, and the like.

At S620, the collected object code of the third-party application is decompiled into a programing code such that information regarding the third-party application may be extracted.

At S630, a public identifier and/or uniform resource locator (URL) that is associated with the third-party application is extracted from the programing code. The public identifier may be for example a client ID. A client ID is a public identifier for applications (e.g., the third-party application) that assists with client/server authentication. The URL may be associated with a digital page allowing to download the third-party application. Extracting the public identifier and/or the URL may be achieved based on a string pattern that is previously determined and therefore detected by, for example, the management server (such as the management server 120 of FIG. 1).

At S640, the monitoring agentless application (MAA) (the MAA 125 shown in FIG. 1), that is executed on the management server (management server 120 shown in FIG. 1), initiates a software as a service (SaaS) instance in a cloud-based computing environment of a SaaS provider. The SaaS instance is an application environment of a SaaS provider that is created for and associated with a unique entity (e.g., a user account, service account, and the like). The SaaS instance may be implemented as a container operating in a cluster deployed by the SaaS provider server, as further discussed in greater detail with respect to FIG. 2.

At S650, the MAA 125 provides to the third-party application access credentials to access the SaaS instance. Access credentials may include for example, username, password, hashed password, token, and the like. It should be noted that, as opposed to other many different types of malicious activities, malicious applications, malicious files, or the like, the third-party application is not downloaded to a computer, a server, or any other similar environment. Thus, when the third-party application receives access credentials to access the SaaS instance, the SaaS provider server provides the third-party application with access entitlements to access resources and data which the SaaS provider server stores.

At S660, the MAA 125 that is executed on the management server 120 extracts behavior data of the third-party application from the SaaS instance based on at least an action that is associated with or performed by the third-party application in the SaaS instance. Behavior data is the representation of the activities performed by, or with respect to, the third-party application. As noted above, the SaaS instance is a cloud-based environment that is created and monitored by the MAA. The SaaS instance is isolated from an authentic cloud-based computing environment (e.g., real organization cloud-based computing environment), and therefore the task of monitoring the actions and interaction performed by and/or associated with the third-party application in the SaaS instance, may consume less processing efforts and therefore save precious processing time.

At optional S670, a predetermined set of attributes of the third-party application that operates on top of a service as a software (SaaS) instance, is extracted. The predetermined set of attributes may be extracted based on a close list of attributes' types that were previously classified as attributes having a highest contribution level to indicating a threat indicator (e.g., threat level) of a third-party application (e.g., a SaaS add-on). In order to extract at least a portion of the predetermined set of attributes the MAA 125 may scan data associated with the third-party application, for example, by accessing an API of the SaaS instance and requesting data, where the requests are based on an array such as a vector, a schema and the like, that contains at least a portion of the attributes. Each attribute in the array may be associated with a parameter and a value related thereto. For example, a first parameter may be "Application Name" and the value related thereto is "Spotify®", a second parameter may be "permissions' types" and the values related thereto are "access calendar", "access contacts list", and so on.

In an embodiment, each attribute may be associated with a weight indicating the importance level of the specific attribute in computing the risk associated with using the third-party application (e.g., SaaS add-on). The weight may be a numeric value between "0" to "1". The value of "0" represents the lowest value indicating that the attribute has no effect on the calculation of the risk, and "1" represents the highest value indicting that the attribute has the highest effect on the calculation of the risk of using the third-party application (e.g., SaaS add-on). For example, a first attribute indicating the number of permissions the third-party application has may be associated with a relatively high weight such as 0.85, while a second attribute indicating the name of the third-party application may be associated with a relatively low weight such as 0.15.

It should be noted that an initial weight of each attribute may be previously determined by, for example, the MAA 125. Determination of the initial weight may be achieved by detecting the weights that are associated with the attributes of each third-party application that was previously monitored. In a further embodiment, the initial weight of a certain attribute(s) of a third-party application may be affected, and consequently adjusted, based on the weights of other attributes of the same third-party application. For example, taken separately, each of ten different attributes may be associated with a relatively low initial weight. However, when the ten attributes are detected as mutual attributes of the same third-party application, one or more of the weights of the ten attributes, may be increased.

At S680, a third-party application catalog (e.g., the third-party application catalog 160 of FIG. 1) is updated based on the extracted behavior data (and optionally the set of attributes) of the third-party application. The third-party application catalog is a database used for storing data about third-party applications. The data stored in the third-party application catalog may be indicative of the threat level of each third-party application. It should be noted that the data stored in the third-party application catalog may be updated from time to time based on new detected properties or activities of the third-party applications, as further discussed herein.

The principles of the disclosure are implemented as hardware, firmware, software, or any combination thereof. Moreover, the software is preferably implemented as an application program tangibly embodied on a program storage unit or computer readable medium. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit.

All examples and conditional language recited herein are intended for pedagogical purposes to aid the reader in understanding the principles of the disclosure and the concepts contributed by the inventor to furthering the art, and are to be construed as being without limitation to such specifically recited examples and conditions. Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It will be appreciated that some embodiments described herein may include one or more generic or specialized processors ("one or more processors") such as microprocessors; central processing units (CPUs); digital signal processors (DSPs): customized processors such as network processors (NPs) or network processing units (NPUs), graphics processing units (GPUs), or the like; field programmable gate arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more application-specific integrated circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer-readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a read-only memory (ROM), a programmable read-only memory (PROM), an erasable programmable read-only memory (EPROM), an electrically erasable programmable read-only memory (EEPROM), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

A person skilled-in-the-art will readily note that other embodiments of the disclosure may be achieved without departing from the scope of the disclosed disclosure. All such embodiments are included herein. The scope of the disclosure should be limited solely by the claims thereto.

What is claimed is:

1. A method for collecting and storing data of third-party applications, the method comprising:
   searching, by a management server in at least one digital web source of a plurality of digital web sources, for a uniform resource locator (URL) that is associated with a web page allowing to download at least one third-party application;
   extracting an identifier of a third-party application from the URL;
   executing, by a monitoring agentless application (MAA) executing on the management server, a software as a service (SaaS) instance in a cloud-based computing environment of the SaaS, wherein the SaaS instance is an isolated instance initiated by the MAA and populated with simulated information and resources;
   providing to the third-party application access credentials to access the SaaS instance, wherein the MAA provides the access credentials to the third-party application for accessing the isolated SaaS instance as a SaaS add-on;
   extracting behavior data from the SaaS instance based on at least an action performed by the third-party application in the SaaS instance, wherein the behavior data is indicative of interactions of the third-party application with the simulated information and resources in the isolated SaaS instance; and
   updating a third-party application catalog with the behavior data of the third-party application.

2. The method of claim 1, wherein the search is based on a predetermined uniform resource locator (URL) pattern, wherein each URL pattern is uniquely associated with a respective digital web source of the plurality of digital web sources, and wherein searching comprises automatically creating an addition to at least one of the URL patterns to detect web pages allowing to download or connect the third-party application.

3. The method of claim 1, further comprising:
extracting a predetermined set of attributes of the third-party application that operates on top of the SaaS instance, wherein extracting the predetermined set of attributes comprises accessing an application programming interface (API) of the isolated SaaS instance and requesting attribute data based on a closed list of attribute types classified as having a highest contribution to a threat indicator.

4. The method of claim 1, further comprising:
determining whether the extracted attributes and/or the behavior data of the third-party application provide amount of data that is above a predetermined threshold value about the third-party application.

5. The method of claim 4, further comprising:
collecting from one or more sources complementary information about the third-party application upon determination that the extracted attributes and the behavior data provide information that is below the predetermined threshold value.

6. A non-transitory computer-readable medium storing instructions for collecting and storing data of third-party applications, wherein, responsive to execution by one or more processors, the instructions cause the one or more processors to perform steps of:
searching, by a management server in at least one digital web source of a plurality of digital web sources, for a uniform resource locator (URL) that is associated with a web page allowing to download at least one third-party application;
extracting an identifier of a third-party application from the URL;
initiating, by a monitoring agentless application (MAA) executing on the management server, a software as a service (SaaS) instance in a cloud-based computing environment of the SaaS, wherein the SaaS instance is an isolated instance initiated by the MAA and populated with simulated information and resources;
providing to the third-party application access credentials to access the SaaS instance, wherein the MAA provides the access credentials to the third-party application for accessing the isolated SaaS instance as a SaaS add-on;
extracting behavior data from the SaaS instance based on at least an action performed by the third-party application in the SaaS instance, wherein the behavior data is indicative of interactions of the third-party application with the simulated information and resources in the isolated SaaS instance; and
updating a third-party application catalog with the behavior data of the third-party application.

7. The non-transitory computer-readable medium of claim 6, wherein the search is based on a predetermined uniform resource locator (URL) pattern, wherein each URL pattern is uniquely associated with a respective digital web source of the plurality of digital web sources, and wherein searching comprises automatically creating an addition to at least one of the URL patterns to detect web pages allowing to download or connect the third-party application.

8. The non-transitory computer-readable medium of claim 6, wherein the steps further include:
extracting a predetermined set of attributes of the third-party application that operates on top of the SaaS instance, wherein extracting the predetermined set of attributes comprises accessing an application programming interface (API) of the isolated SaaS instance and requesting attribute data based on a closed list of attribute types classified as having a highest contribution to a threat indicato.

9. The non-transitory computer-readable medium of claim 6, wherein the steps further include:
determining whether the extracted attributes and/or the behavior data of the third-party application provide amount of data that is above a predetermined threshold value about the third-party application.

10. The non-transitory computer-readable medium of claim 9, wherein the steps further include:
collecting from one or more sources complementary information about the third-party application upon determination that the extracted attributes and the behavior data provide information that is below the predetermined threshold value.

11. A management server comprising:
one or more processors; and
memory storing instructions that, when executed, cause the one or more processors to:
search, at least one digital web source of a plurality of digital web sources, for a uniform resource locator (URL) that is associated with a web page allowing to download at least one third-party application;
extract an identifier of a third-party application from the URL;
initiate, by a monitoring agentless application (MAA) executing on the management server, a software as a service (SaaS) instance in a cloud-based computing environment of the SaaS, wherein the SaaS instance is an isolated instance initiated by the MAA and populated with simulated information and resources;
provide to the third-party application access credentials to access the SaaS instance, wherein the MAA provides the access credentials to the third-party application for accessing the isolated SaaS instance as a SaaS add-on;
extract behavior data from the SaaS instance based on at least an action performed by the third-party application in the SaaS instance, wherein the behavior data is indicative of interactions of the third-party application with the simulated information and resources in the isolated SaaS instance; and
update a third-party application catalog with the behavior data of the third-party application.

12. The management server of claim 11, wherein the search is based on a predetermined uniform resource locator (URL) pattern, wherein each URL pattern is uniquely associated with a respective digital web source of the plurality of digital web sources, and wherein searching comprises automatically creating an addition to at least one of the URL patterns to detect web es allowing to download or connect the third-party application.

13. The management server of claim 11, wherein the instructions that, when executed, further cause the one or more processors to:
extract a predetermined set of attributes of the third-party application that operates on top of the SaaS instance, wherein extracting the predetermined set of attributes comprises accessing an application programming interface (API) of the isolated SaaS instance and questing attribute data based on a closed list of attribute types classified as having a highest contribution to a threat indicator.

14. The management server of claim 11, wherein the instructions that, when executed, further cause the one or more processors to:

determine whether the extracted attributes and/or the behavior data of the third-party application provide amount of data that is above a predetermined threshold value about the third-party application.

15. The management server of claim 14, wherein the instructions that, when executed, further cause the one or more processors to:

collect from one or more sources complementary information about the third-party application upon determination that the extracted attributes and the behavior data provide information that is below the predetermined threshold value.

* * * * *